US012619567B2

(12) United States Patent (10) Patent No.: US 12,619,567 B2
Govindachar (45) Date of Patent: May 5, 2026

(54) NETWORK ON CHIP FOR HIGH PERFORMANCE COMPUTING AND A METHOD OF USING THE SAME

(71) Applicant: Mercedes-Benz Group AG, Stuttgart (DE)

(72) Inventor: Suresh Govindachar, Sunnyvale, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/537,107

(22) Filed: Dec. 12, 2023

(65) Prior Publication Data

US 2025/0190386 A1    Jun. 12, 2025

(51) Int. Cl.
*G06F 13/40* (2006.01)

(52) U.S. Cl.
CPC .................................... *G06F 13/40* (2013.01)

(58) Field of Classification Search
CPC .. G06F 13/40; G06F 13/4004; G06F 13/4022; G06F 13/4027; G06F 13/4063
See application file for complete search history.

(56) References Cited

U.S. PATENT DOCUMENTS

| | | | |
|---|---|---|---|
| 6,285,208 B1 | 9/2001 | Ohkubo | |
| 10,992,257 B2 | 4/2021 | Narla | |
| 11,386,013 B2 | 7/2022 | Shetty | |
| 11,388,054 B2 | 7/2022 | Bernat | |
| 11,410,266 B2 | 8/2022 | Matam | |
| 11,565,606 B2 | 1/2023 | Kazuno | |
| 11,573,856 B1 | 2/2023 | Ditty | |
| 11,870,682 B2 * | 1/2024 | Ronen | ................. H04L 41/0663 |
| 2017/0302739 A1 * | 10/2017 | Hughes | ................. H04W 40/02 |
| 2018/0069696 A1 | 3/2018 | Yoo | |
| 2018/0205671 A1 * | 7/2018 | Hung | ...................... H04L 45/24 |
| 2019/0391855 A1 | 12/2019 | Bernat | |
| 2020/0017114 A1 | 1/2020 | Santoni et al. | |

(Continued)

FOREIGN PATENT DOCUMENTS

| | | |
|---|---|---|
| CN | 110879546 A | 3/2020 |
| CN | 112149369 A | 12/2020 |

(Continued)

OTHER PUBLICATIONS

Francois Piednoel, Snug Silicon Valley 2023 Keynote, The Standardization Imperative for Chiplets. Mar. 29-30, 2023, Santa Clara, CA. https://www.synopsys.com/community/resources/videos/snug-keynotes.html.

(Continued)

*Primary Examiner* — Raymond N Phan
(74) *Attorney, Agent, or Firm* — Mahamedi IP Law LLP

(57) ABSTRACT

A network on chip for high performance computing includes a first fat-tree network topology that connects each of a number of initiator nodes to one of a number of initiator core switches through one or more levels of initiator edge switches. A second fat-tree network topology connects each of the target nodes to one of a number of target core switches through one or more levels of target edge switches, and the first fat-tree network topology is joined to the second fat-tree network topology through connections between the initiator core switches and the target core switches.

18 Claims, 8 Drawing Sheets

(56) References Cited

U.S. PATENT DOCUMENTS

| | | | |
|---|---|---|---|
| 2020/0127936 A1* | 4/2020 | Luo | H04L 47/522 |
| 2020/0201335 A1 | 6/2020 | Somers | |
| 2020/0327023 A1 | 10/2020 | Hayes | |
| 2021/0179136 A1 | 6/2021 | Kim | |
| 2022/0057798 A1 | 2/2022 | Costin | |
| 2022/0114028 A1 | 4/2022 | Peng et al. | |
| 2022/0169270 A1 | 6/2022 | Wei | |
| 2022/0206846 A1 | 6/2022 | Windh | |
| 2022/0274610 A1 | 9/2022 | Chen | |
| 2022/0283971 A1 | 9/2022 | Lee | |
| 2022/0412974 A1 | 12/2022 | Tabib-Azar | |
| 2023/0017583 A1 | 1/2023 | Shah | |
| 2023/0032305 A1 | 2/2023 | Krishnani | |
| 2023/0036117 A1 | 2/2023 | Krishnani | |
| 2023/0063601 A1 | 3/2023 | Upadhyay | |
| 2023/0132724 A1* | 5/2023 | Shah | G06F 9/44505 |
| | | | 710/110 |
| 2023/0185624 A1 | 6/2023 | Yao | |
| 2023/0305993 A1 | 9/2023 | Davis | |
| 2023/0325315 A1 | 10/2023 | Dolbeau | |
| 2025/0284650 A1 | 9/2025 | Piednoel | |

FOREIGN PATENT DOCUMENTS

| | | |
|---|---|---|
| CN | 114780227 A | 7/2022 |
| CN | 115688093 A | 2/2023 |
| GB | 2560708 | 9/2018 |
| KR | 20210015472 A | 2/2021 |

OTHER PUBLICATIONS

International Search Report and Written Opinion of the International Searching Authority for Application No. PCT/EP2025/053664 mailed Mar. 28, 2025.

* cited by examiner

Receiving a memory access request
710

Splitting the memory access request into multiple subrequests
720

Transmitting the subrequests across a network on chip with a pair of connected fat-tree network topologies
730

Receiving responses to the subrequests
740

Combining the responses to provide a combined response to the memory access request
750

NETWORK ON CHIP FOR HIGH PERFORMANCE COMPUTING AND A METHOD OF USING THE SAME

BACKGROUND

In modern electronics and integrated circuit design, the demand for higher performance, reduced power consumption, and increased functionality has led to the development of advanced integration techniques. Two architecture designs that have emerged as solutions to these challenges are systems on chip (SoC) and networks on chip (NoC). These technologies are pivotal in advancing the design and implementation of complex electronic systems, particularly in the context of microprocessors, application-specific integrated circuits (ASICs), and other semiconductor devices.

A system on chip is an integrated circuit that integrates multiple functional blocks and components, such as processors, memory units, input/output interfaces, and various peripheral devices onto a single silicon chip. The primary motivation behind the development of SoCs is to achieve a high level of integration, allowing for compact and efficient designs that deliver improved performance, lower power consumption, and reduced manufacturing costs compared to traditional discrete designs. By incorporating diverse functionalities into a single chip, SoCs have facilitated the creation of highly sophisticated devices, ranging from smartphones and wearable gadgets to automotive control systems and industrial automation equipment.

A network on chip is an architectural paradigm that addresses the intricate communication requirements within an SoC. As SoCs continue to grow in complexity and include a myriad of functional blocks, efficient and scalable communication mechanisms become more important. By providing a dedicated communication infrastructure, NoCs ensure efficient and reliable data transfer among the numerous functional blocks within an SoC, regardless of their physical placement on the chip. They offer a robust framework for data exchange, synchronization, and coordination among different modules while accommodating the increasing demand for bandwidth, low latency, and fault tolerance.

BRIEF DESCRIPTION OF THE DRAWINGS

The disclosure herein is illustrated by way of example, and not by way of limitation, in the figures of the accompanying drawings in which like reference numerals refer to similar elements.

DETAILED DESCRIPTION

Figure 1:
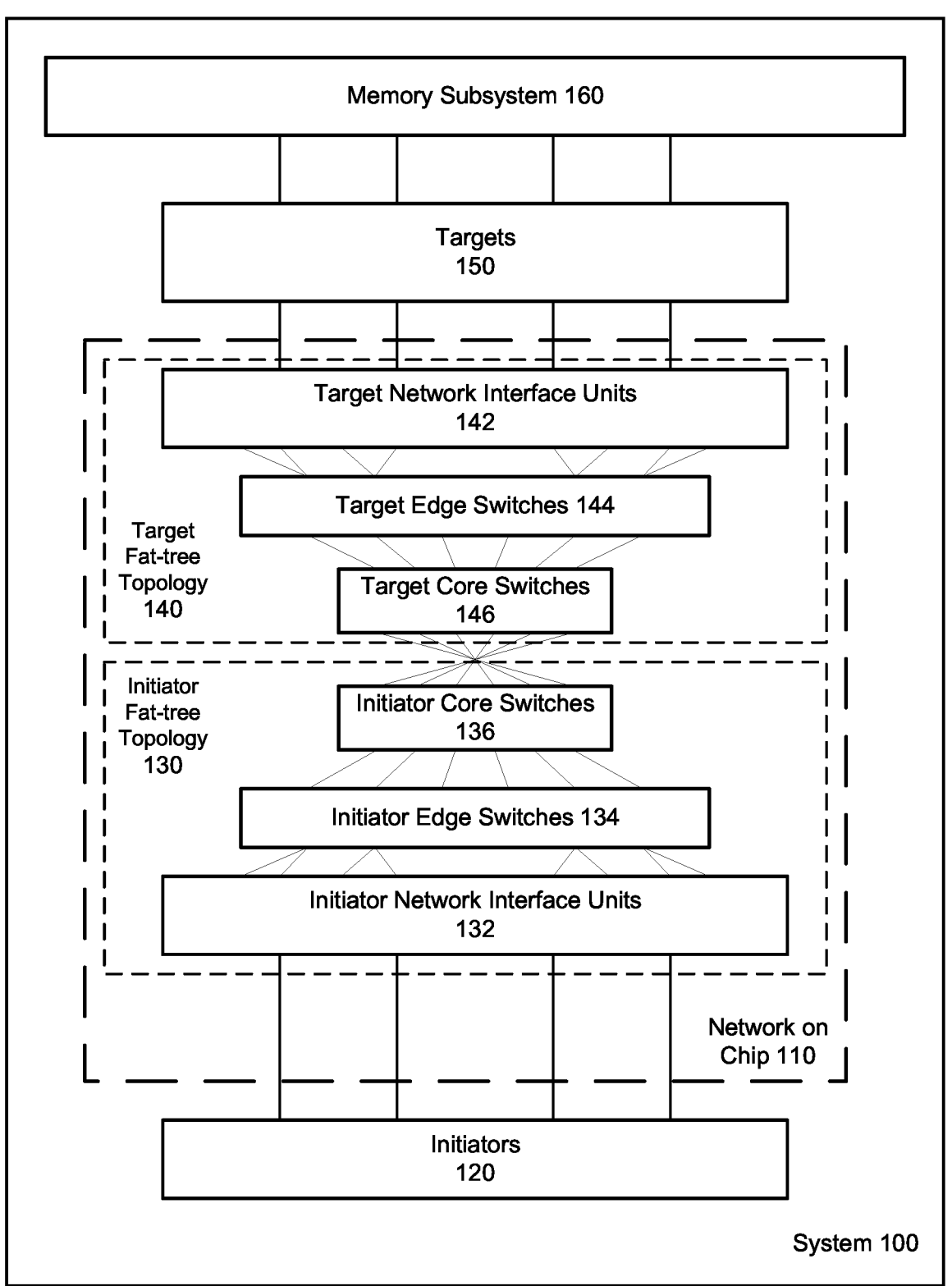
FIG. 1 is a block diagram depicting an example system in which embodiments described herein may be implemented, in accordance with some aspects.

A network on chip for high performance computing is described herein that implements a network topology combining two fat-tree topologies in an hourglass configuration. A first fat-tree network topology connects initiator nodes, which issue memory read and write requests, through one or more levels of edge switches to initiator core switches. A second fat-tree network topology connects target nodes, which receive the memory read and write requests, through one or more levels of edge switches to target core switches. The number of switches at each level is reduced hierarchically until it is possible to perform any-to-any connections directly. The first fat-tree network topology is joined to the second fat-tree network topology through the any-to-any connections between the initiator core switches and the target core switches.

Today's complex system on chip (SoC) designs can contain between tens to hundreds of blocks using diverse intellectual properties (IP). Each IP block has its own data width, clock frequency, and interface protocol. Connecting all these IPs is a significant challenge in SoC design, which has been addressed by network on chip (NoC) architectures. In the case of an initiator IP, a network interface packetizes the data generated by the IP, assigns an ID to the packet, and dispatches it into the network. When the packet arrives at its destination IP, the associated interface extracts the data from the packet and transforms it into the protocol required by the IP. A large number of packets can be in flight throughout the network at any given time depending on the topology of the NoC.

The topology is a fundamental aspect of NoC design, and it has a profound effect on the overall network cost and performance. The topology determines the physical layout and connections between nodes and channels. Nodes represent individual processing units or components within a larger integrated circuit, such as processors, memory blocks, or accelerators. These nodes serve as endpoints for data communication and computation in the system, and the NoC enables communication between these endpoints. Channels are the interconnect pathways that connect these nodes, facilitating the exchange of data and control signals between them. Some nodes can also be interfaces to external IO, for example, interfaces to external memory or an external PCI express network. Channels can take various forms, including wires, buses, or dedicated communication links, and they play a crucial role in enabling efficient and scalable communication among nodes in the complex on-chip network, ensuring the seamless flow of data and coordination of tasks within the integrated circuit. The number of nodes any given packet travels through and the width and length of each connection between the nodes depends on the topology. Thus, the topology significantly influences latency and power consumption. Furthermore, since the topology determines the number of alternative paths between nodes, it affects the network traffic distribution, and hence the network bandwidth and performance achieved.

Current technology enables creating chiplets that contain a large number of Digital Signal Processors (DSPs) capable of super scalar and wide (e.g., 1024 bits) vector operations. Current technology also enables chiplets to include high bandwidth memory (HBM) that stacks dynamic random-access memory (DRAM) dies with wide memory buses to achieve higher bandwidth while using less power in a substantially smaller form factor than previously possible. However, current network topologies used at the silicon level to connect the DSPs and memory, including cache memory, are limited to less throughput than the DSPs are capable of handling. Thus, a new network topology is needed that can support higher bandwidth while still ensuring low latency, any-to-any connectivity, equidistant connectivity, and uniform access among all nodes.

Different types of NoC network topologies include crossbars, stars, rings, meshes, and trees. Compared to the other types of network topologies, trees are more cost-effective and easier for small systems to implement, as they require fewer wires and switches. Tree topologies can also be more energy efficient, as data can be routed to their destinations while passing through a minimal number of nodes. In a regular tree topology, every branch has the same thickness (bandwidth), regardless of their place in the hierarchy-they are all "skinny" (i.e., low bandwidth). In contrast, in a fat-tree, branches nearer the top of the hierarchy are "fatter" and therefore provide more bandwidth than branches further down the hierarchy. An advantage of this topology is that switching elements may be identical, enabling the NoC to leverage less expensive commodity components for the switches in the communication architecture. Further, fat-trees are rearrangeably non-blocking, meaning that for arbitrary communication patterns, there is some set of paths that will saturate the bandwidth available to the end hosts in the topology. Given a cross-section cutting through some of the links of a NoC, the cross-section bandwidth is the sum of the bandwidths (i.e., frequency of the clock multiplied by the width of the link) of each of the cut links. Two notable cross-sections are those associated with the initiators in the NoC and those associated with the targets in the NoC. The network topology described herein allows the bandwidth at the targets to equal or exceed the bandwidth at the initiators.

Existing cache designs popular in SoC design require that the interior and the exterior widths of the last level cache are the same. Thus, if the bandwidth between the cache and the system memory (i.e., HBM) supports a throughput of one terabyte per second, the bandwidth between the cache and the interior is similarly limited to a throughput of one terabyte per second, assuming that both sides operate at the same clock frequency, as is common. The network topology described herein allows the two sides of the cache to not match each other for clock frequency, data width, and/or number of read/write ports, thereby allowing the interior side of the cache to match or exceed the needs of the initiators.

The network topology described herein goes beyond typical advantages of a last level cache, such as hiding latency of access to slow memory (e.g., external DDR or internal HBM). The network topology described herein utilizes the claimed combination of fat-tree topologies to enable initiator nodes to have uniform access to the entire address space of the system memory without any sub-region of the address space needing a special relationship to any subset of initiators. The network topology described herein enables any-to-any and equidistant connectivity, as gauged by the number of hops, between initiators and target memory channels and also affords several tuning parameters beyond the parameters of a fat-tree, such as the location for implementing striding and the degrees of striding in the nodes between the initiators and the targets and the size of the address stride.

In an example, a network on chip for high performance computing includes a first fat-tree network topology that connects each of a number of initiator nodes to one of a number of initiator core switches through one or more levels of initiator edge switches. A second fat-tree network topology connects each of the target nodes to one of a number of target core switches through one or more levels of target edge switches, and the first fat-tree network topology is joined to the second fat-tree network topology through connections between the initiator core switches and the target core switches.

In some aspects, a last level cache is between a system memory with a contiguous address space and the second fat-tree network topology, and the target nodes comprise virtual memory channels connected to the system memory through the last level cache.

In further aspects, addressing of the system memory strides across the virtual memory channels, such that each of the initiator nodes has uniform access to the contiguous address space at a granularity of a predetermined stride width.

In further aspects, the total bandwidth at the plurality of target nodes is at least equal to the total bandwidth at the plurality of initiator nodes.

In further aspects, the connections between the plurality of initiator core switches and the plurality of target core switches are in an any-to-any configuration.

In further aspects, at least some of the plurality of initiator nodes correspond to direct memory access interfaces for digital signal processors.

In further aspects, at least some of the plurality of initiator nodes correspond to chiplets comprising a system on chip.

In further aspects, each of the plurality of initiator nodes has topologically equidistant connectivity to each of the plurality of target nodes.

In some aspects, an initiator node of a network on chip receives a memory access request. The initiator node splits the memory access request into a number of subrequests based on an amount of memory specified by the memory access request, a number of target nodes in the network on chip, and a predetermined stride width for the network on chip.

In further aspects, the initiator node receives responses to the subrequests and combines the responses to provide a combined response to the memory access request. In examples where the memory access request is a read request, the read request specifies a memory address and the amount of memory to read, and the responses would be the requested data. In examples where the memory access request is a write request, the write request specifies a memory address and includes a data payload to be written starting at that memory address, and the responses would be the status of the completion of the write.

In some aspects, the initiator node splits the memory access request into the subrequests, receives responses to the subrequests, and combines the responses to the subrequests.

In further aspects, one or more of the initiator core switches, the initiator edge switches, the target core switches, and/or the target edge switches split the memory access request into the subrequests, receive responses to the subrequests, and combine the responses to the subrequests.

One or more aspects described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more aspects described herein can be implemented using programmatic modules, engines, or components. A programmatic module, engine, or component can include a program, a sub-routine, a portion of a program, a software component, or a hardware component capable of performing one or more stated tasks or functions. As used herein, a module or component can exist on a hardware component independently of other modules or components. Alternatively, a module or component can be a shared element or process of other modules, programs, or machines.

Furthermore, one or more aspects described herein may be implemented through the use of instructions that are executable by one or more processors. These instructions may be stored on a computer-readable medium. Machines shown or described with figures below provide examples of processing resources and computer-readable media on which instructions for implementing some aspects can be stored and/or executed. In particular, the numerous machines shown or described include processors and various forms of memory for storing data and instructions. Examples of computer-readable media include permanent memory storage devices, such as hard disk drives on personal computers or servers. Other examples of computer storage media include portable storage units, such as CD or DVD units, flash or solid-state memory (such as carried on cell phones, tablets, and other consumer electronic devices), and magnetic memory. Computers, terminals, and network-enabled devices (e.g., mobile devices such as cell phones) are all examples of machines and devices that utilize processors, memory, and instructions stored on computer-readable media.

Alternatively, one or more examples described herein may be implemented using dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions, and processing is performed by interconnected gates. Furthermore, such circuitry may include configuration registers that can be used to select options such as the address stride, striding location, frequency of operation, etc.

System Overview

FIG. 1 is a block diagram depicting an example system 100 in which embodiments described herein may be implemented, in accordance with some aspects. The system 100 includes a number of initiators 120 and targets 150 that communicate through a network on chip 110 comprising two fat-tree network topologies arranged in an hourglass configuration. The initiator fat-tree topology 130 connects the initiators 120 to a number of initiator core switches 136, and the target fat-tree topology 140 connects the targets 150 to a number of target core switches 146. The initiator core switches 136 and target core switches 146 are connected together in one of many possible configurations, including an any-to-any configuration.

In some aspects, the network on chip 110 has total bandwidth at the targets 150 at least as large as the total bandwidth at the initiators 120. That is, for example, when all links of the network on chip 110 operate at the same clock frequency, the sum of the line widths connecting each target 150 to the network (when these line widths are equal, this would be the number of targets 150 multiplied by the line width connecting each target 150 to the network) is at least as large as the sum of the line widths connecting each initiator 120 to the network (when these line widths are equal, this would be the number of initiators 120 multiplied by the line width connecting each initiator 120 to the network). Furthermore, each level of the tree hierarchy has total bandwidth at least as large as the total bandwidth at the initiators 120. In one example, the initiators 120 are digital signal processors. In another example, the initiators 120 are chiplets on a system on chip.

In some aspects, initiator nodes of the initiator fat-tree topology 130 are initiator network interface units 132 associated with the initiators 120. One of the initiator network interface units 132 receives a memory access request from its corresponding initiator 120. The initiator network interface unit 132 uses an address translator to remap the memory address specified by the memory access request into the contiguous address space of the memory subsystem 160. The initiator network interface unit 132 can stride, or split the memory access request into a number of subrequests, based on an amount of memory specified by the memory access request, a number of target nodes in the network on chip, and a predetermined stride width for the target nodes. These subrequests are then passed through the initiator edge switches 134 and initiator core switches 136 of the initiator fat-tree topology 130 and the target core switches 146 and target edge switches 144 of the target fat-tree topology 140 to reach the target network interface unit 142 corresponding to the memory address specified in each subrequest. In other aspects, the striding can be performed by the switches of the network on chip 110, such as the initiator core switches 136.

The initiator edge switches 134 form the leaves at the edge of the initiator fat-tree topology 130. In aspects with multiple levels of edge switches, the initiator edge switches 134 can also include one or more aggregation tiers of switches (not illustrated) between the leaves and the initiator core switches 136 at the root of the tree.

The target edge switches 144 form the leaves at the edge of the target fat-tree topology 140. In aspects with multiple levels of edge switches, the target edge switches 144 can also include one or more aggregation tiers of switches (not illustrated) between the leaves and the target core switches 146 at the root of the tree. The initiator core switches 136 and target core switches 146 are connected in one of many possible configurations, including an any-to-any configuration.

In some aspects, the initiator edge switches 134, initiator core switches 136, target edge switches 144, and target core switches 146 are switches with similar hardware (i.e., silicon) and software configurations, except that they differ in terms of how many ports they have connecting to the previous and next levels of the topology. In another aspect, the initiator edge switches 134, initiator core switches 136, target edge switches 144, and target core switches 146 run different software that splits memory requests and subrequests into further subrequests based on the level of the switch within the topology, number of target network interface units 142, and a predetermined stride width for the topology. The target network interface units 142 can represent the target nodes of the memory access requests and subrequests and connect the targets 150 to the switches of the target fat-tree topology 140. In aspects, the initiators 120 and targets 150 are topologically equidistant to one another in an abstract sense. For example, as illustrated and described, the number of hops (i.e., the number of nodes a packet travels through) is the same for different pairs of source and destination. However, as implemented in silicon, there may be registers between some pairs of nodes but not other pairs, resulting in different number of clocks (i.e., different nanoseconds) between different pairs of source and destination.

In some aspects, the targets 150 are virtual memory channels connected to a memory subsystem 160. The memory subsystem 160 implements a contiguous address space shared between components of the system 100, and the addressing of the system memory strides across the virtual memory channels, such that each of the initiators 120 has uniform access to the contiguous address space at a granularity of the predetermined stride width. The memory subsystem 160 can include a high bandwidth memory (HBM) device and additional components such as a memory scheduler and memory controller.

Although aspects are illustrated and described with initiators 120 and targets 150, the network on chip 110 is typically full-duplex bidirectional. Therefore, in some aspects, the initiators 120 can act as targets, and the targets 150 can act as initiators of memory access requests. Furthermore, the network on chip 110 is described using examples where the targets 150 are memory interfaces. However, the advantages of the claimed topology still apply when some or all the initiators 120 have both initiator and target interfaces. In such examples, there may be no discrete targets 150 or memory. Furthermore, in some degenerate cases, when the number of initiators 120 is sufficiently small, the initiator network interface units 132 may take the role of the initiator core switches 136; likewise for the target network interface units 142 and target core switches 146 when the number of targets 150 is sufficiently small.

Figure 2:
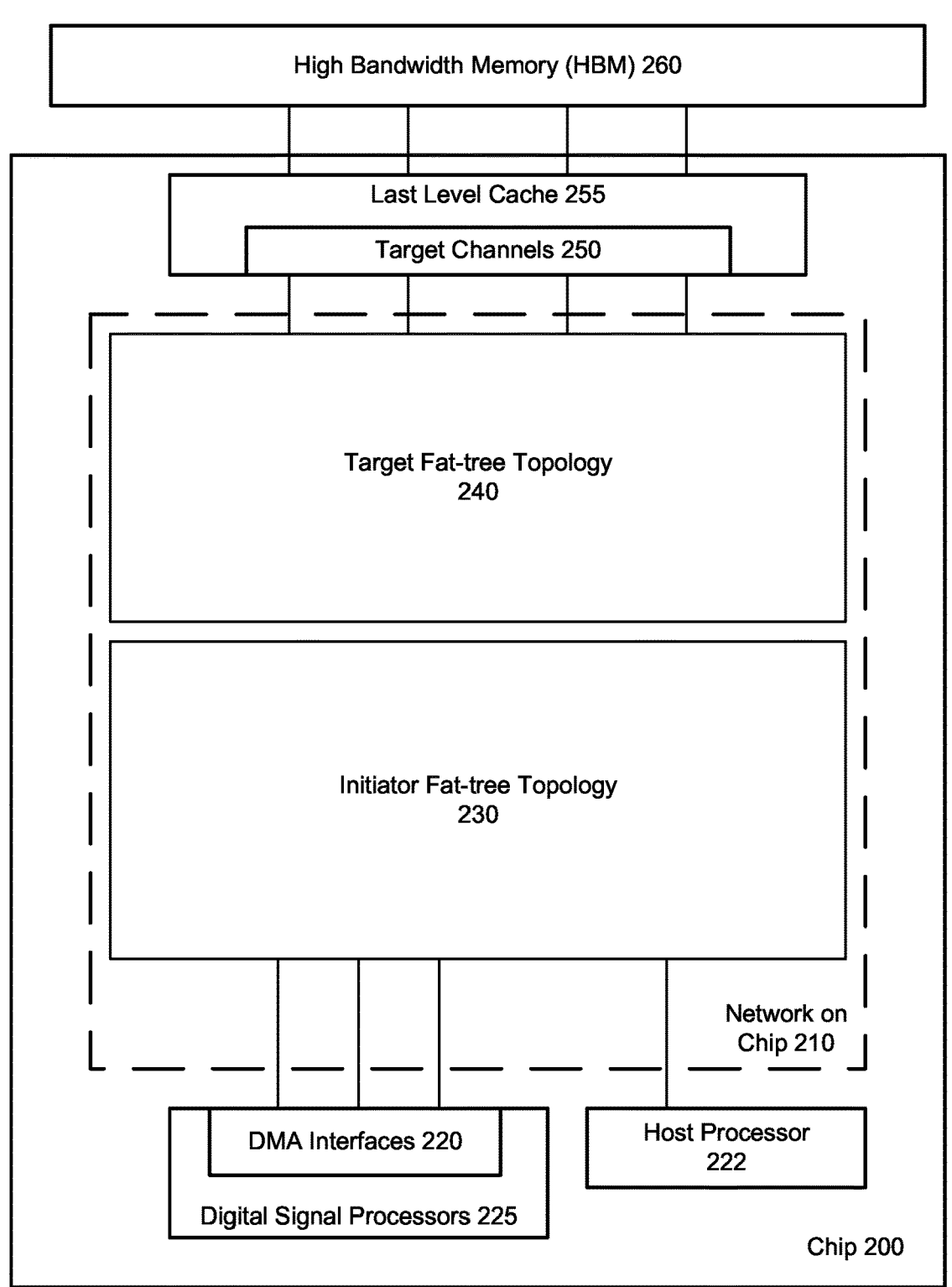
FIG. 2 is a block diagram depicting one embodiment of a network on chip for high performance computing.

FIG. 2 is a block diagram depicting one embodiment of a network on chip 210 for high performance computing. Digital Signal Processors (DSPs) 225, arranged on a chip 200 or chiplet, interface with virtual channels of a High Bandwidth Memory (HBM) 260 through the initiator fat-tree topology 230 and target fat-tree topology 240 of the network on chip 210.

In some aspects, each DSP 225 has a direct memory access (DMA) interface 220 acting as an initiator of transactions (e.g., memory read and write requests), and each virtual channel is a target interface. In one example, the DMA interfaces 220 act as the initiator nodes. In other examples, the DMA interfaces 220 are connected to initiator network interface units. The network on chip 210 can be implemented on a chip 200, a chiplet, among chiplets, or any combination thereof. In addition, small amounts of data may be transferred in and out of the network on chip 210 by the involvement of the DSPs 225 and/or host processor 222 without the use of DMA, such as through programmed input-output (PIO). Although shown as only being connected to the network on chip 210 for simplicity, the DSPs 225 (and the host processor 222) can have multiple ports to interface to multiple NOCs that are not illustrated.

Digital Signal Processors (DSPs) 225 are specialized microprocessors designed to efficiently manipulate and process digital signals, such as audio, video, and sensor data, in real-time or near-real-time applications. These processors excel at performing mathematical operations like filtering, convolution, and Fourier transformations, making them invaluable in tasks like audio processing, telecommunications, image and video compression, and control systems. DSPs 225 are known for their speed and precision, enabling them to analyze and modify signals with high accuracy, often through dedicated hardware accelerators and optimized algorithms. This makes DSPs 225 indispensable in a wide range of applications, from smartphones and consumer electronics to industrial automation and scientific research.

One specialized component of DSPs 225 is a SIMD (Single Instruction, Multiple Data) engine for performing the same operation on multiple data elements simultaneously. SIMD is a parallel processing technique that allows a DSP 225 to efficiently process arrays or vectors of data in a single instruction cycle, making it highly suitable for tasks involving repetitive operations such as particle filtering. The number of bits of the SIMD engine can vary based on the DSP. In some aspects, the number of bits of the SIMD engine matches the line width connecting the DSPs 225 to the network on chip 210. In one example, the DSPs 225 use a 512-bit SIMD engine. In another example, the DSPs 225 use a 1024-bit SIMD engine.

DMA interfaces 220 are specialized hardware subsystems that allow for efficient, autonomous data transfer between the DSPs' 225 internal memory and external memory or peripherals without the direct involvement of the DSPs' 225 core processing unit. DMA enables rapid and direct movement of data, such as audio samples or sensor readings, between memory locations or I/O devices, reducing CPU overhead and enhancing overall processing speed. It is particularly crucial in real-time DSP applications, as it ensures timely data handling while freeing up the DSP's computational resources for signal processing tasks, making it indispensable for tasks like audio streaming, image processing, and communication protocols in embedded systems.

In some aspects, in addition to the DSPs 225, the chip 200 includes a host processor 222 which may also act as an initiator of transactions across the network. The host processor 222 performs preliminary work on newly available data, such as double precision work that the host processor 222 is designed to process more efficiently than the DSPs 225. Upon completing this work, the host processor 222 can signal the DSPs 225 to run a main application, such as particle filtering, on the data. The DSPs 225 read and write data in the HBM 260 by sending memory access requests to their DMA interface 220, which can divide the memory access request into multiple subrequests based on an amount of memory specified by the memory access request, a number of target channels 250, and a predetermined stride width (e.g., 1024 bits).

In some aspects, each of the target nodes correspond to a virtual memory target channel 250, and each target channel 250 has a corresponding network interface unit connected to an interior interface of a last level cache 255. In some examples, these interior interfaces are AXI or CHI target interfaces on cache controllers of each SRAM cache block of the last level cache 255. Each cache block of the last level cache 255 has a cache controller that can read and write data from internal cache banks and the HBM 260 independently of the other cache controllers. Each piece of memory in the last level cache 255 may have a limited bandwidth, but the aggregate of the cache banks adds up to a substantial total bandwidth.

In one example, the last level cache 255 consists of 8 cache units with 4 cache blocks each for a total of 32 cache blocks and 32 target channels 250. The cache controller of each cache block is also connected to a memory controller of the HBM 260 through a port of a supported protocol (e.g., AXI, CHI, etc.). In some examples, there may be an additional network to translate transactions and enable connectivity between each cache controller and the memory controller of the HBM 260. As such, the virtual memory channels are connected to the system memory (i.e., the HBM 260) through the last level cache 255. The chip 200 can also include caches in addition to the last level cache 255. For example, the DMA interfaces 220 may connect to a cache placed before the initiator fat-tree topology 230. The last level cache 255 itself may be placed between the initiator fat-tree topology 230 and the target fat-tree topology 240. In some aspects, the last level cache 255 is non-coherent with any other caches in the system. The system may also include a coherency controller to snoop the bus transactions to implement full cache coherency.

Figure 3:
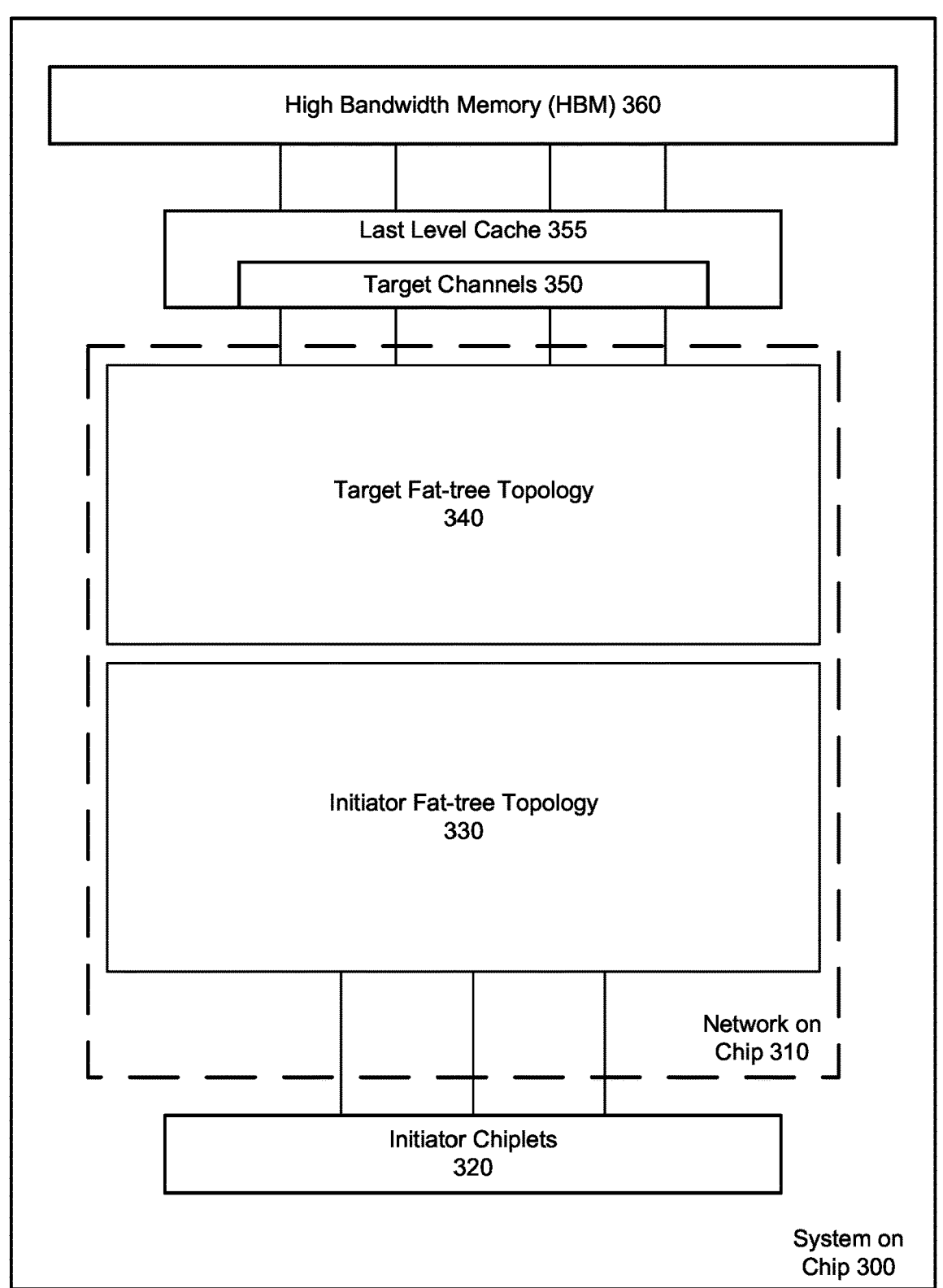
FIG. 3 is a block diagram depicting another embodiment of a network on chip for high performance computing.

FIG. 3 is a block diagram depicting another embodiment of a network on chip 310 for high performance computing. A number of initiator chiplets 320, arranged on a system on chip 300, interface with virtual channels of a High Bandwidth Memory (HBM) 360 through the initiator fat-tree topology 330 and target fat-tree topology 340 of the network on chip 310. In some examples, the network on chip 310 connects the initiator chiplets 320, and each initiator chiplet 320 has its own NoC, the combination of which can be considered a single network on chip 310.

In some aspects, each of the target nodes correspond to a virtual memory target channel 350, and each target channel 350 has a corresponding network interface unit connected to an interior interface of the last level cache 355. In some examples, these interior interfaces are AXI or CHI target interfaces on cache controllers of each SRAM cache block of the last level cache 355. Each cache block of the last level cache 355 has a cache controller that can read and write data from internal cache banks and the HBM 360 independently of the other cache controllers.

Figure 4:
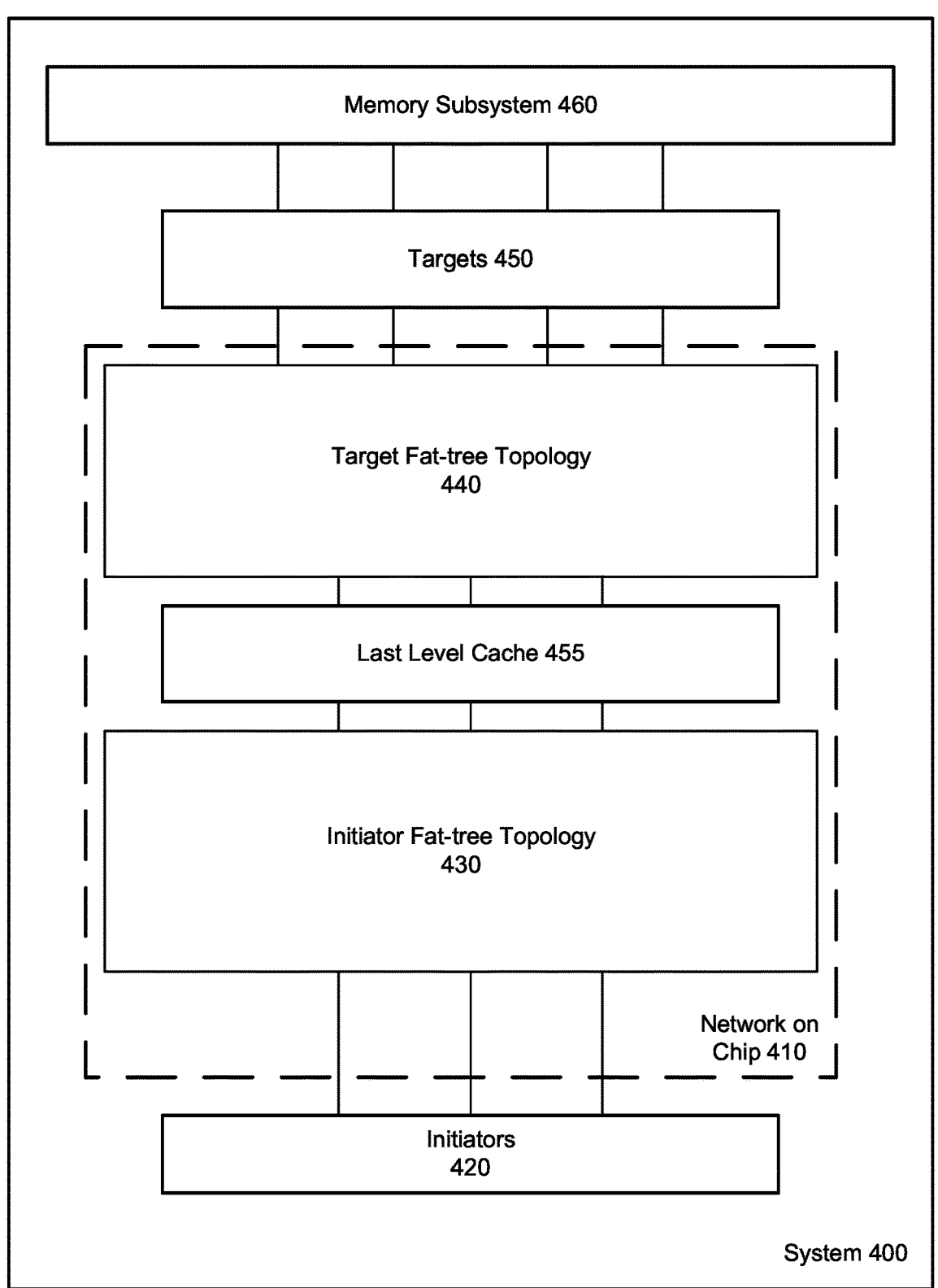
FIG. 4 is a block diagram depicting an example system in which embodiments described herein may be implemented, in accordance with some aspects.

FIG. 4 is a block diagram depicting an example system 400 in which embodiments described herein may be implemented, in accordance with some aspects. The system 400 includes a number of initiators 420 and targets 450 that communicate through a network on chip 410 comprising two fat-tree network topologies arranged in an hourglass configuration. The initiator fat-tree topology 430 connects the initiators 420 to a number of initiator core switches, and the target fat-tree topology 440 connects the targets 450 to a number of target core switches.

In one aspect, a last level cache 455 is placed between the core switches of the initiator fat-tree topology 430 and the target fat-tree topology 440. For example, the last level cache 455 may be adjacent to the target core switches with the last level cache 455 having an any-to-any connection with the initiator core switches. In another example, the last level cache 455 can be placed adjacent to the initiator core switches with the last level cache 455 having an any-to-any connection with the target core switches.

Figure 5:
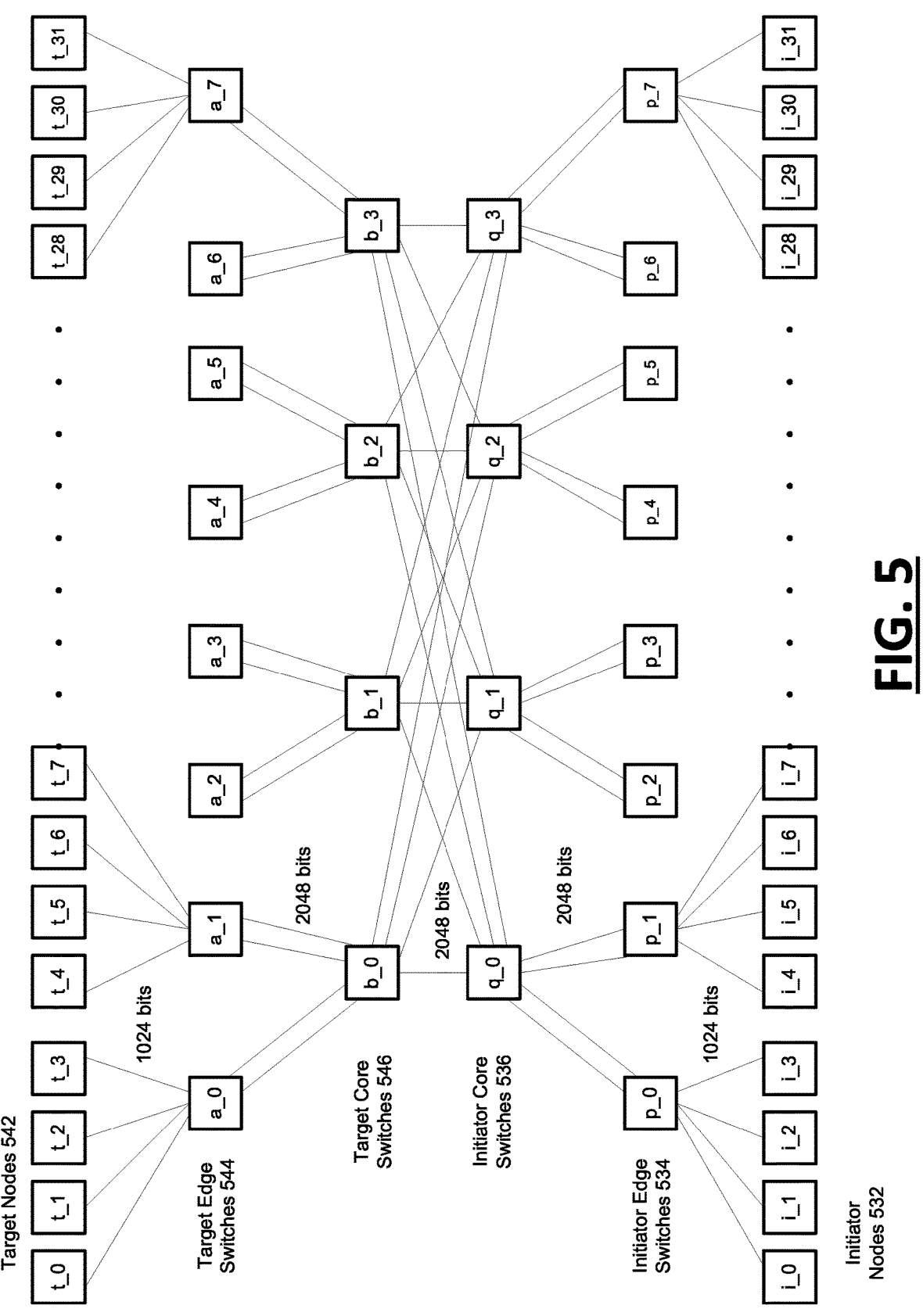
FIG. 5 is a block diagram depicting an example network on chip configuration.

FIG. 5 is a block diagram depicting an example network on chip configuration. The example shown in FIG. 5 depicts 32 initiator nodes with a 1024-bit line width connecting the initiator nodes 532 to the initiator edge switches 534. An initiator fat-tree topology comprises, from the bottom up, a level of initiator nodes 532, a level of initiator edge switches 534, and a level of initiator core switches 536. A target fat-tree topology comprises, from the top down, a level of target nodes 542, a level of target edge switches 544, and a level of target core switches 546. The example network of FIG. 5 can be used in aspects including DSPs with 1024-bit SIMD engines.

In the example shown, the target nodes 542 correspond to virtual channels of width 1024 bits, or 128 bytes, connected to system memory through a last level cache. With a stride width of 128 bytes, the first virtual channel corresponding to node t_0 handles memory access requests for memory addresses starting from address zero to 127. The second virtual channel corresponding to node t_1 handles memory access requests for memory addresses starting from address 128 to 255. The third virtual channel corresponding to node t_2 handles memory access requests for memory addresses starting from address 256 to 383. In some aspects, after the 32nd virtual channel, the memory addresses wrap around and begin again at t_0. The initiator nodes 532 connect to the initiator edge switches 534 using links of width 1024 bits, or 128 bytes.

For a memory access request to read 1000 bytes starting at memory address zero, the read request needs to be sent to multiple virtual channels because any given virtual channel only handles 128 contiguous bytes of memory. Since the read request is for 1000 bytes, the first eight virtual channels are to be queried for the data.

In one aspect, the initiator node i_0 receives the memory access request and partitions it into eight subrequests. The first subrequest specifies a read of 128 bytes starting from memory address zero, and the second subrequest specifies a read of 128 bytes starting from memory address 128. The eighth and final subrequest specifies the remaining 104 bytes starting from memory address 896. These subrequests are routed based on their headers through the switches of the network to the appropriate target nodes 542 t_0 through t_7, passing through p_0, q_0, b_0, and either a_0 or a_1. The last level cache and/or system memory reads the requested data and responds to each of the subrequests, routing them back through the network to node i_0, which receives the seven separate packets of 128 bytes and one of 104 bytes. The initiator node 532 reassembles the separate packets since the initiator is expecting a single packet of 1000 bytes.

In another aspect, the initiator nodes 532 send the full memory access request to the initiator edge switches 534, and the switches are programmed to inspect each request to determine whether the request should be divided into subrequests at that level and which switches on the next level should receive the new subrequests. Using the previous example, target core switch 546 b_0 could create two subrequests, sending a first request for 512 bytes to a_0, intended for target nodes 542 t_0 through t_3, and a second request for 488 bytes to a_1, intended for target nodes 542 t_4 through t_7. The creation of appropriate subrequests occurs again at target edge switches 544 a_0 and a_1. Target core switch 546 b_0 reassembles the responses to the subrequests and sends a single response back to i_0.

In aspects where the initiator nodes 532 handle creating subrequests and reassembling the subrequests, the initiator edge switches 534, initiator core switches 536, target edge switches 544, and target core switches 546 are commodity switching components with similar silicon and software, differing in terms of how many ports they have on each side of the network and the width of those ports. In the example shown, the initiator edge switches 534 p_0 through p_7 have four ports of 1024 bits each connected to the initiator nodes 532 and two ports of 2048 bits each connected to the initiator core switches 536. The initiator core switches 536 and target core switches 546 have four ports of 2048 bits on each side, creating an any-to-any connection between the initiator fat-tree topology and the target fat-tree topology.

Figure 6:
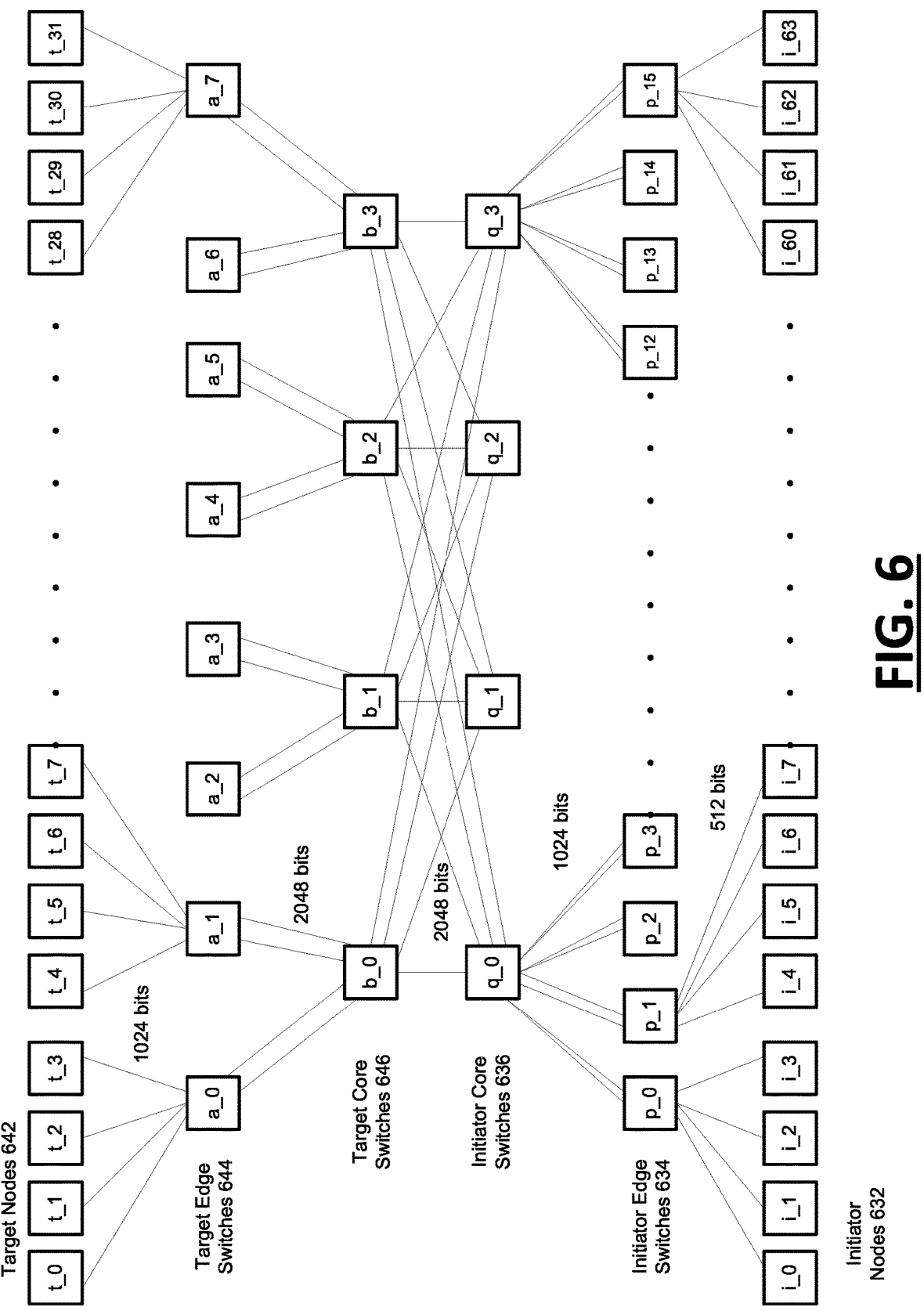
FIG. 6 is a block diagram depicting another example network on chip configuration.

Although single lines are labeled with widths such as "512 bits," "1024 bits," and "2048 bits" in FIGS. 5 and 6, it should be understood that a single line may be implemented as a group of lines. For example, a 1024 bit line may be implemented as a group of sixteen 64 bit lines. Each line illustrated can also represent two lines, one per direction. Each of those lines may also be implemented as a pair of two lines for differential signaling.

FIG. 6 is a block diagram depicting another example network on chip configuration. The example shown in FIG.

6 depicts 64 initiator nodes with a 512-bit line width connecting the initiator nodes 632 to the initiator edge switches 634. An initiator fat-tree topology comprises, from the bottom up, a level of initiator nodes 632, a level of initiator edge switches 634, and a level of initiator core switches 636. A target fat-tree topology comprises, from the top down, a level of target nodes 642, a level of target edge switches 644, and a level of target core switches 646. The example network of FIG. 6 can be used in aspects including initiator DSPs with 512-bit SIMD engines or initiator chiplets using 512-bit interfaces to the cache and/or memory subsystem of the system on chip.

In the example shown, the target nodes 642 correspond to virtual channels of width 1024 bits, or 128 bytes, connected to system memory through a last level cache. With a stride width of 128 bytes, the first virtual channel corresponding to node t_0 handles memory access requests for memory addresses starting from address zero to 127. The second virtual channel corresponding to node t_1 handles memory access requests for memory addresses starting from address 128 to 255. The third virtual channel corresponding to node t_2 handles memory access requests for memory addresses starting from address 256 to 383. In some aspects, after the 32nd virtual channel, the memory addresses wrap around and begin again at t_0. The initiator nodes 632 connect to the initiator edge switches 634 using links of width 512 bits, or 64 bytes.

In aspects where the initiator nodes 632 handle creating subrequests and reassembling the subrequests, the initiator edge switches 634, initiator core switches 636, target edge switches 644, and target core switches 646 are commodity switching components with similar silicon and software, differing in terms of how many ports they have on each side of the network and the width of those ports. In the example shown, the initiator edge switches 634 p_0 through p_7 have four ports of 512 bits each connected to the initiator nodes 632 and two ports of 1024 bits each connected to the initiator core switches 636. The initiator core switches 636 and target core switches 646 have four ports of 2048 bits on each side, creating an any-to-any connection between the initiator fat-tree topology and the target fat-tree topology.

Methodology

Figure 7:
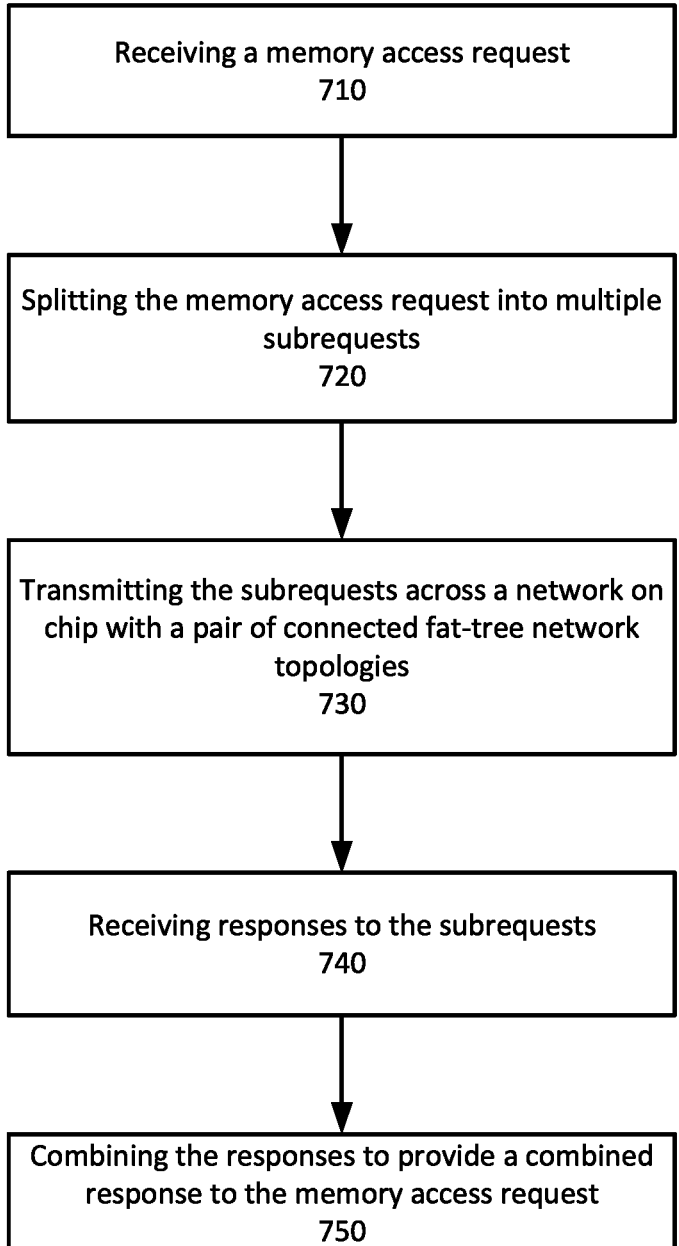
FIG. 7 is a flow chart describing a method of using an example network on chip, in accordance with some aspects.
Figure 8:
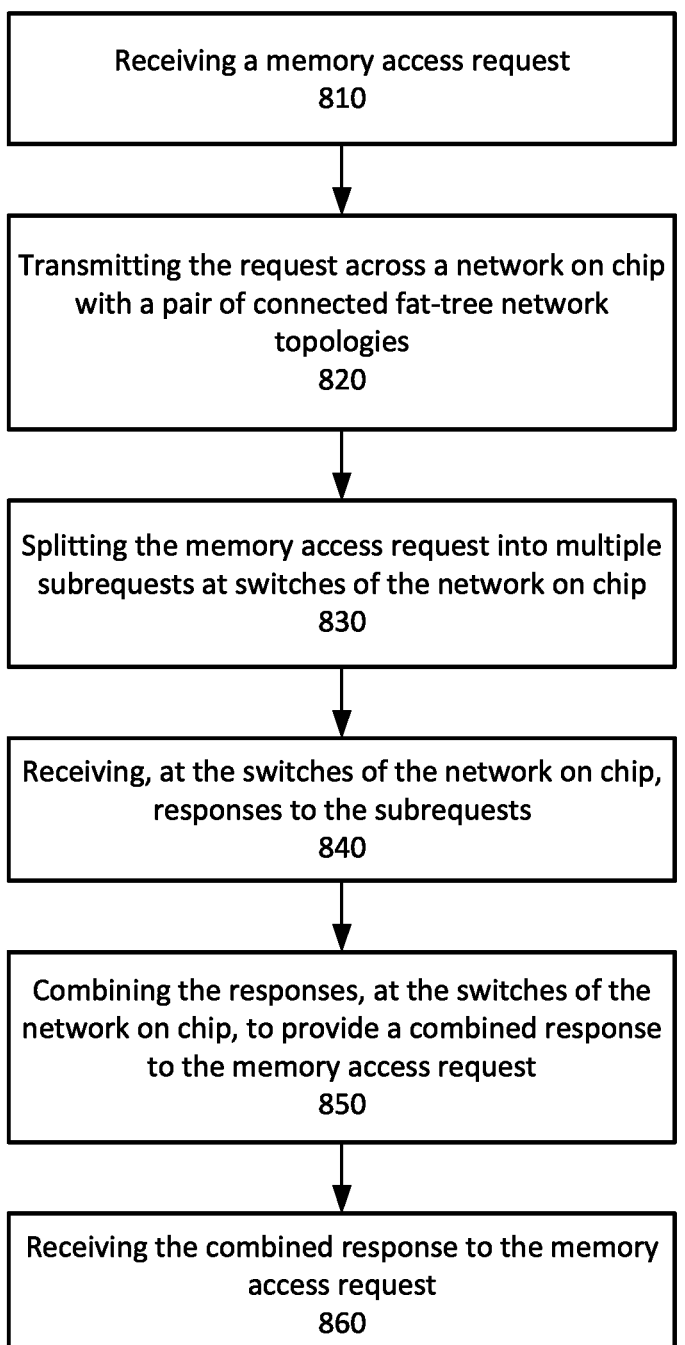
FIG. 8 is a flow chart describing another method of using an example network on chip, in accordance with further aspects.

FIG. 7 is a flow chart describing a method of using an example network on chip, in accordance with some aspects. FIG. 8 is a flow chart describing another method of using an example network on chip, in accordance with further aspects. While operations of the methods may be described below as being performed by specific components, modules, or subsystems of the system 100, it will be appreciated that these operations need not necessarily be performed by the specific components identified and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in system 100 can be arranged within a single hardware, software, or firmware component. It will also be appreciated that some of the steps of this method may be performed in parallel or in a different order than illustrated.

In one example, an initiator node (e.g., network interface unit) of an initiator fat-tree topology receives a memory access request from its corresponding initiator (e.g., a DSP or chiplet) (710). The initiator node can use an address translator to remap the memory address specified by the memory access request into the contiguous address space of the memory subsystem and can split the memory access request into a number of subrequests based on an amount of memory specified by the memory access request, a number of target nodes, and a predetermined stride width (720).

The subrequests are passed through initiator edge switches and initiator core switches of the initiator fat-tree topology and the target core switches and target edge switches of the target fat-tree topology to reach the target network interface unit corresponding to the memory address specified in each subrequest (730). A last level cache attached to the target network interface units receives the subrequests and, for a read request, retrieves the requested data from memory, either from cache banks in the cache itself or from an attached system memory. For a write request, the last level cache can write the supplied data to cache memory and/or pass the supplied data to the attached system memory. For each of the subrequests, the last level cache sends a response back across the network to the initiator.

In one example, the initiator node that sent the original memory access request receives the responses from the last level cache for each subrequest sent (740). For a read request, the responses include the requested data read from the cache or system memory. The initiator node combines the responses to the subrequests to provide a combined response to the original memory access request to the requesting initiator unit (750).

In one example, an initiator node (e.g., network interface unit) of an initiator fat-tree topology receives a memory access request from its corresponding initiator (e.g., a DSP or chiplet) (810). The initiator node can use an address translator to remap the memory address specified by the memory access request into the contiguous address space of the memory subsystem.

Rather than striding the memory access request at the initiator node, the initiator node can transmit the memory access request across the network and allow the switches of the network to perform the striding (820).

In some aspects, one or more of the initiator core switches, the initiator edge switches, the target core switches, and/or the target edge switches split the memory access request into subrequests based on an amount of memory specified by the memory access request, a number of target nodes, and a predetermined stride width (830). For example, the memory access request may be passed through the network and then split into subrequests upon reaching the initiator core switches. In response to receiving the responses to the subrequests, the initiator core switches (840) can combine the responses to provide a combined response to the initiator edge switches and initiator node (850). In this example, the initiator node receives the combined response to the original memory access request and sends the response to the requesting initiator unit (860).

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A system comprising:

a plurality of initiator nodes;

a plurality of target nodes;

a first fat-tree network topology connecting each of the plurality of initiator nodes to one of a plurality of initiator core switches through one or more levels of initiator edge switches;

a second fat-tree network topology connecting each of the plurality of target nodes to one of a plurality of target core switches through one or more levels of target edge switches, the first fat-tree network topology being joined to the second fat-tree network topology through connections between the plurality of initiator core switches and the plurality of target core switches;

a system memory with a contiguous address space; and a last level cache between the system memory and the second fat-tree network topology, wherein the plurality of target nodes comprise a plurality of virtual memory channels connected to the system memory through the last level cache.

2. The system of claim 1, wherein addressing of the system memory strides across the virtual memory channels, such that each of the initiator nodes has uniform access to the contiguous address space at a granularity of a predetermined stride width.

3. The system of claim 1, wherein a total bandwidth between the last level cache and the second fat-tree network topology is greater than the total bandwidth the last level cache and the system memory.

4. The system of claim 1, further comprising:

a last level cache between the first fat-tree topology and the second fat-tree topology.

5. The system of claim 1, wherein total bandwidth at the plurality of target nodes is at least equal to the total bandwidth at the plurality of initiator nodes.

6. The system of claim 1, wherein the connections between the plurality of initiator core switches and the plurality of target core switches are in an any-to-any configuration.

7. The system of claim 1, wherein at least some of the plurality of initiator nodes correspond to direct memory access interfaces for digital signal processors.

8. The system of claim 1, wherein at least some of the plurality of initiator nodes correspond to chiplets comprising a system on chip.

9. The system of claim 1, wherein each of the plurality of initiator nodes has topologically equidistant connectivity to each of the plurality of target nodes.

10. A method comprising:

receiving, at an initiator node of a network on chip, a memory access request;

splitting the memory access request into a plurality of subrequests based on an amount of memory specified by the memory access request, a plurality of target nodes in the network on chip, and a predetermined stride width for the network on chip; and transmitting the plurality of subrequests across the network on chip through (a) a first fat-tree network topology connecting the initiator node to one of a plurality of initiator core switches through one or more levels of initiator edge switches, and (b) a second fat-tree network topology connecting each of the plurality of target nodes to one of a plurality of target core switches through one or more levels of target edge switches, the first fat-tree network topology being joined to the second fat-tree network topology through connections between the plurality of initiator core switches and the plurality of target core switches.

11. The method of claim 10, further comprising:

receiving responses to the plurality of subrequests; and combining the responses to the plurality of subrequests to provide a combined response to the memory access request.

12. The method of claim 10, wherein the memory access request is a read request specifying a memory address and the amount of memory to read.

13. The method of claim 10, wherein the memory access request is a write request specifying a memory address and the amount of memory is a data payload to be written starting at that memory address.

14. The method of claim 11, wherein the initiator node splits the memory access request into the plurality of subrequests, receives responses to the plurality of subrequests, and combines the responses to the plurality of subrequests.

15. The method of claim 11, wherein one or more of the initiator core switches, the initiator edge switches, the target core switches, and/or the target edge switches split the memory access request into the plurality of subrequests, receive responses to the plurality of subrequests, and combine the responses to the plurality of subrequests.

16. A network on chip comprising:

a plurality of initiator nodes;

a plurality of target nodes;

a first fat-tree network topology connecting each of the plurality of initiator nodes to one of a plurality of initiator core switches through one or more levels of initiator edge switches;

a second fat-tree network topology connecting each of the plurality of target nodes to one of a plurality of target core switches through one or more levels of target edge switches, the first fat-tree network topology being joined to the second fat-tree network topology through connections between the plurality of initiator core switches and the plurality of target core switches; and a last level cache, wherein the last level cache is between a system memory with a contiguous address space and the second fat-tree network topology, and wherein the plurality of target nodes comprise a plurality of virtual memory channels connected to the system memory through the last level cache.

17. The network on chip of claim 16, wherein addressing of the system memory strides across the virtual memory channels, such that each of the initiator nodes has uniform access to the contiguous address space at a granularity of a predetermined stride width.

18. The network on chip of claim 16, wherein a total bandwidth between the last level cache and the second fat-tree network topology is greater than the total bandwidth between the last level cache and the system memory.

* * * * *